2,895,874

DIAMINO-PYRIMIDINE COMPOSITIONS FOR CHEMOTHERAPY OF COCCIDIOSIS

Russell E. Lux, Myerstown, and Ammon M. Brubaker, Sheridan, Pa., assignors to Whitmoyer Laboratories, Inc., Myerstown, Pa., a corporation of Delaware No Drawing. Application March 27, 1953
Serial No. 345,252

12 Claims. (Cl. 167—53.1)

This invention relates generally to the art of veterinary medicine and more particularly to the chemotherapy of the disease in poultry known as coccidiosis.

Coccidiosis in poultry ranks in the forefront with those diseases which are most destructive and causes very large annual economic losses. Coccidiosis is a protozoan infection, commonly occurring between the ages of two to fourteen weeks in poultry. The disease organisms multiply in the digestive tract, particularly in the intestine. Disease symptoms are characterized by bowel disorders, hemorrhage, anemia and general unthriftiness. Mortality is generally substantial, varying with the severity of infection.

Two common types of coccidiosis are known: the "cecal," caused by the coccidium Eimeria tenella, and characterized by a severe hemorrhage on or about the fifth day after infection; and the "intestinal" caused by at least seven types of Eimeria; namely, E. acervulina, E. necatrix, E. maxima, E. hagani, E. mitis, E. praecox, and E. brunetti. The intestinal type is generally referred to as the "chronic," and the "cecal" as the "acute."

Various therapeutic preparations have been used to lessen the severity of the losses associated with the disease. Our general experience has been that those preparations now commercially available have one or more of the following drawbacks or failings: Their effectiveness in suppressing or treating the disease is not high; quite often the high use levels required impose an economic burden on the user; the drugs may function only as a prophylactic and not as a control for an established infection; their use may be attended by certain undesirable side effects, namely, toxicity, as evidenced by lowered weight gains and feed consumption.

It is an object of this invention to provide an effective therapeutic control of coccidiosis in poultry which largely overcomes the above-mentioned disadvantages of treatments heretofore used. This invention provides compositions which may be fed to poultry in very small yet effective dosage without discernible unwanted side effects. The very low use levels make their use extremely economical. Furthermore, mortality due to severe infections of coccidiosis in poultry may be reduced to nil, or at least to minimum.

We have discovered that certain compounds belonging to the chemical class known as diamino-pyrimidines are effective to control infections of coccidiosis when fed to the poultry in an ingestive vehicle in very low concentrations. An what is probably more significant, we have discovered that certain of the diamino-pyrimidines effectively synergize certain of the sulfonamide drugs so that infections of coccidiosis may be controlled when a combination of these diamino-pyrimidines and these sulfonamides are mixed in very low concentration with an ingestive vehicle. "Ingestive vehicles" as used herein will be understood to mean feed or drink normally partaken by poultry such as grain, mash, scratch, water or other liquids. This synergism is surprising, in view of the fact that although sulfonamide drugs have heretofore been suggested and used in the control of coccidiosis, some of them by themselves are relatively ineffectual against coccidiosis and even these are rendered extremely effective in the synergistic combination. By virtue of this synergism, percentages of the diamino-pyrimidine and the sulfonamide are possible far below those which would have to be used if either of them were used alone to achieve the same end, even in the case of sulfonamides known to be useful in the treatment of coccidiosis. That is, the dosage of sulfonamide which would normally be recommended and used for control of coccidiosis can be reduced to 1/10 to 1/100 of the normal dosage when used in the synergized combination of the diamino-pyrimidine and the sulfonamide. And it is particularly surprising that by combining the diamino-pyrimidine with a sulfonamide, such, for example, as sulfanilamide, which is relatively ineffective alone as a coccidiostat, the otherwise inactive sulfonamide becomes effectively active as a coccidiostat.

The diamino-pyrimidines that we have found to be active compounds for the treatment and control of coccidiosis in poultry are those of the general formula:

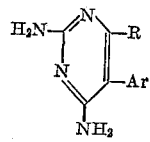

in which R is H, or a lower n-alkyl group containing one to five carbon atoms inclusive, and Ar is an appropriately substituted phenyl group; effective substituted phenyl groups include p-chlorophenyl and 3,4 dichlorophenyl.

The compounds which we have found to be particularly useful as coccidiostats belong to the class described chemically as 2,4-diamino-5-(p-chlorophenyl)-6-(alkyl)-pyrimidines (where the alkyl contains a straight chain of one to five carbons inclusive). We have found that when fed to poultry in feed mash the optimum use level is .0035% to .015% administered as a prophylactic and 0.25% to .029% administered as a treatment. These percentages are considerably lower than those permissible with most medications which have heretofore been commercially available.

Moreover, we have found that the diamino-pyrimidines mentioned in the two preceding paragraphs are effective synergists for certain sulfonamides so that the therapeutic activity of the sulfa drugs may be effectively enhanced when a diamino-pyrimidine is administered together with a sulfonamide or a mixture of sulfonamides and the dosage may be considerably less than the dosage required if only one of these substances were administered.

The use of sulfonamides for treating coccidiosis has been practised for more than a decade. Some are known as effective coccidiostats, others are ineffective and others are of intermediate effect in their activity. Generally high levels, viz., concentrations, were required, until the more recent N'-pyrimidyl types appeared. The most successful sulfonamide so far developed for treatment of coccidiosis appears to be sulfaquinoxaline. This has permitted comparatively low use levels: 0.15% as a propylactic; .05% as a treatment of an established infection when administered in an ingestive vehicle such as mash feed.

Notwithstanding the effectiveness of the various sulfa drugs used or suggested as coccidiostats and their varying optimum or permissible use levels, we have found that whichever of the sulfonamides that may be selected for use as a remedy for the treatment of coccidiosis, their activity may be enhanced by use in conjunction with them of the diamino-pyrimidines herein mentioned as having the desirable synergistic activity so that a preparation may be produced which is effective in lower concentration (in an ingestive vehicle) than if the sulfas selected were used alone as a coccidiostat.

Consequently the coccidiostatic preparation comprising a combination of a synergistic diamino-pyrimidine and one or more sulfonamides as contemplated by the invention has decided advantages. First, relatively inactive sulfonamides, such as sulfanilamide, may be rendered substantially the equal of the present-day sulfaquinoxaline medication, and, secondly, smaller dosages of sulfonamides may be used. For example, we have found that sulfamerazine is active at 1/100 the usual dosage when synergized by the addition of 2,4-diamino-5-(p-chlorophenyl)-6-ethyl pyrimidine.

The use and effectiveness of the diamino-pyrimidines both alone and with sulfa drugs (viz., sulfonamides) have been tested in varying relative amounts and concentrations or use levels. In conducting screening tests to determine activity of the various diamino-pyrimidines mentioned and combinations of the diamino-pyrimidines and sulfa drugs, the following described procedure was used: A large number of chicks three to four weeks of age, divided into groups, are infected by administering to them orally equal amounts of coccidiosis cocysts, such as E. tenella. This infection will result in a certain percentage of mortality in five to eight days, if the chicks do not receive a drug which is therapeutically active in suppressing the infection. Each group of infected chicks is given a compound being tested and in each test is included a group of the same flock of chicks which were not given any medication (this group being designated an unmedicated control) and also included is a group of infected chicks to which is administered a drug heretofore known to be one active to suppress coccidiosis (this group being designated as a medicated control). In this way results with a group of chicks receiving the compound being tested can be compared with both of the control groups.

An infection of E. tenella will also produce a certain amount of damage or lesions to the cecal walls. These are evaluated in the tests on each chick that dies during the course of the test. After eight days several survivors from each group are sacrificed for autopsy and the cecal lesions evaluated. Accordingly, in addition to comparing mortality rates in the groups, a comparison of cecal lesions of the test compound group with the control groups serves as a basis for determining therapeutic activity.

In some instances in the tests, the test compound was administered before the chicks were infected and in others it was administered after infection. For example, in the tables which appear hereinafter under the column "Conditions," "+24" indicates that the drug dosage was started twenty-four hours before infection, while "−48" indicates that it was started forty-eight hours after infection. This serves to determine whether the compound is therapeutically active in suppressing an infection which is already established or only in preventing the occurrence or spread of cecal coccidiosis in a flock.

The compounds being tested were administered by including them in the mash and in some instances in the drinking water in amounts or concentrations as indicated in the tables hereinafter. That is, the birds consumed the compounds together with the carrier vehicle ad libitum.

The results of illustrative tests are set forth in the tables and this data will serve to show the activity of the compounds listed in combatting or suppressing coccidiosis at different use levels.

TABLE I

| Test No. | Ref. No. | Drug Level, Percent | Conditions | Ingestive Vehicle | Mortality, Percent | Cecal Lesions |
|---|---|---|---|---|---|---|
| Drug tested-[2,4-diamino-5-(p-chlorophenyl)-6-methyl pyrimidine] | | | | | | |
| 60V | U.M.C. | 0 | | mash | 30 | +++ |
| 60V | 1 | .03 | −48 | do | 0 | ++ |
| 60V | 2 | .06 | −48 | do | 0 | + |
| Drug tested-[2,4-diamino-5-(p-chlorophenyl)-6-ethyl pyrimidine] Drug used in medicated control (M.C.)—sulfaquinoxaline | | | | | | |
| 53V | U.M.C. | 0 | | mash | 43 | ++ |
| 53V | M.C. | .025 | +48 | water | 0 | + |
| 53V | 3 | .02 | +48 | mash | 0 | + |
| 53V | 4 | .05 | +48 | do | 0 | trace |
| 57V | U.M.C. | 0 | | do | 20 | ++++ |
| 57V | M.C. | .037 | −48 | do | 14 | +++ |
| 57V | 5 | .009 | +24 | do | 0 | +++ |
| 57V | 6 | .015 | +24 | do | 0 | ++ |
| 57V | 7 | .03 | +24 | do | 0 | ++ |
| 57V | 8 | .03 | −48 | do | 40 | +++ |
| 58V | U.M.C. | 0 | | do | 0 | trace |
| 58V | M.C. | .05 | +24 | do | 0 | trace |
| 58V | 9 | .03 | −48 | do | 30 | +++ |
| 60V | U.M.C. | 0 | | do | 10 | ++ |
| 60V | 10 | .01 | −48 | do | 0 | + |
| 60V | 11 | .03 | −48 | do | 0 | |
| Drug tested-[2,4-diamino-6-n-amyl-5-(p-chlorophenyl)-pyrimidine] Drug used in medicated control (M.C.)—nitrofurazone | | | | | | |
| 52V | U.M.C. | 0 | | mash | 50 | +++ |
| 52V | M.C. | .02 | +48 | do | 0 | + |
| 52V | 12 | .02 | +48 | do | 10 | ++ |
| 52V | 13 | .05 | +48 | do | 0 | + |
| Drug tested-[2,4-diamino-5-(3',4'-dichlorophenyl)-6-methyl pyrimidine] Drug used in medicated control (M.C.)—sulfaquinoxaline | | | | | | |
| 67V | U.M.C. | 0 | | mash | 50 | ++++ |
| 67V | M.C. | .05 | +24 | do | 0 | ++ |
| 67V | 14 | .008 | +24 | do | 0 | + |

In the foregoing Table I, U.M.C. indicates a group that was not given any drug and is designated as an unmedicated control. M.C. designates a medicated control, the drug used being set forth beneath the name of the drug used in the test. The column designated "Conditions" indicates the time before or after in hours the group of chicks was infected with E. tenella cocysts, the + sign indicating before infection, the − sign indicating after infection. The column "Ingestive Vehicle" indicates the manner of administering the drug. The column "Mortality" shows the number (expressed in percent) in the particular group that have died during an eight-day period. The column "Cecal Lesions" indicates the severity of lesions. As a standard for comparison, +++++ is taken as severe, and a single + is taken as slight.

Tests conducted by us have shown not only that the diamino-pyrimidines as set forth in the tables above are active in controlling coccidiosis in poultry when fed in an ingestive vehicle at optimum use levels of .0035% to .015% when administered as a prophylactic and .25% to .029% administered as a treatment of an infected flock, but also that these diamino-pyrimidines are effective synergists for the sulfonamides so that the therapeutic activity of the sulfa drugs may be effectively enhanced when the drugs are used in combination and in combination the dosage may be considerably less than the dosage if only one of them is administered.

It has been established that the sulfonamide drug in the combination may be varied over wide concentration ranges and effectiveness is still retained. The following tabulation illustrates effective combinations. Be it noted that these examples are merely illustrative of the principle of the invention, and are not to be construed as limiting the invention to these combinations alone.

| Synergist, Percent Limits | | Sulfa, Percent Limits | |
|---|---|---|---|
| 1. Synergist is: 2,4-diamino-5-(p-chlorophenyl)-6-ethyl pyrimidine. | .002–.01 | Sulfanilamide | .04–.4 |
| | | Sulfathiazole | .02–.2 |
| | | Sulfamerazine | .005–.05 |
| | | Sulfamethazine | .002–.03 |
| | | Sulfaquinoxaline | .0005–.025 |
| 2. Synergist is: 2,4-diamino-5-(p-chlorophenyl)-6-propyl pyrimidine. | .004–.02 | Sulfamerazine | .005–.05 |
| | | Sulfaquinoxaline | .0005–.025 |
| 3. Synergist is: 2,4-diamino-6-n-amyl-5-(p-chlorophenyl) pyrimidine. | .004–.02 | Sulfamerazine | .005–.05 |
| | | Sulfaquinoxaline | .0005–.025 |

The above figures refer to so-called "treatment levels" of the medications. These percentages, when analyzed, show that it is possible to cut the normal coccidiostatic dose of the sulfa from 1/10 to 1/100, depending on the sulfa. Furthermore, it is possible to cut the percentage of diamino pyrimidine to less than the values shown, if this deficiency is remedied by increasing relatively the dosage of sulfa.

The following Table II sets forth the data and results of illustrative tests with respect to the synergistic combinations. The tabulated data are from tests conducted in similar manner as described above in connection with Table I. The following Index is an index of the Roman numerals appearing in the tables:

Index

I—designates 2,4-diamino-5-(p-chlorophenyl)-6-ethyl pyrimidine.

III—designates 2,4-diamino-5-(p-chlorophenyl)-6-methyl pyrimidine.

XVII—designates 2,4-diamino-5-(p-chlorophenyl)-6-propyl pyrimidine.

XVIII—designates 2,4-diamino-6-methyl-5-(p-nitrophenyl) pyrimidine.

II—designates sulfaquinoxaline.

X—designates sulfamerazine.

XIV—designates sulfamethazine.

XIX—designates sulfathiazole.

XX—designates sulfanilamide.

XXIII—designates sulfadiazine.

XXIV—designates sulfaguanidine.

TABLE II

| Test No. | Ref. No. | Synergist, Percent | Sulfonamide, Percent | Conditions | Mortality, Percent | Cecal Lesions |
|---|---|---|---|---|---|---|
| 60V | U.M.C. | 0 | 0 | | 30 | +++ |
| 60V | 48 | .005 III | .01 II | −48 | 0 | +++++ |
| 60V | 49 | .0075 III | .01 II | −48 | 0 | 0 |
| 60V | 50 | .01 III | .01 II | −48 | 0 | trace |
| 55V | U.M.C. | 0 | 0 | | 0 | + |
| 55V | M.C. | 0 | .4 XIV | | 20 | ++++ |
| 55V | 51 | .005 I | .0033 II | +24 | 0 | 0 |
| 55V | 52 | .005 I | .0133 XIV | +24 | 0 | trace |
| 56V | U.M.C. | 0 | 0 | | 0 | trace |
| 56V | M.C. | 0 | .5 X | | 20 | ++++ |
| 56V | 53 | .005 I | .016 X | +24 | 0 | 0 |
| 56V | 54 | .005 I | .0084 X | +24 | 0 | trace |
| 56V | 55 | .005 I | .005 X | +24 | 0 | + |
| 56V | 56 | .0066 I | .0125 X | +24 | 0 | + |
| 56V | 57 | .0035 I | .0125 X | +24 | 0 | + |
| 56V | 58 | .0022 I | .0125 X | +24 | 0 | +++ |
| 57V | U.M.C. | 0 | 0 | | 20 | +++ |
| 57V | M.C. | 0 | .037 II | | 14 | +++ |
| 57V | 59 | .005 I | .016 X | +24 | 0 | +++ |
| 57V | 60 | .005 I | .0033 II | −48 | 0 | +++ |
| 58V | U.M.C. | 0 | 0 | | 0 | +++ |
| 58V | M.C. | 0 | .05 II | | 40 | +++ |
| 58V | 61 | .01 I | .0167 X | +24 | 0 | + |
| 58V | 62 | .01 I | .008 X | −48 | 0 | + |
| 58V | 63 | .01 I | .025 XIX | −48 | 0 | + |
| 58V | 64 | .01 I | .05 XX | −48 | 0 | + |
| 60V | U.M.C. | 0 | 0 | | 0 | trace |
| 60V | 65 | .0065 I | .0005 II | −48 | 30 | +++ |
| 60V | 66 | .0065 I | .001 II | −48 | 60 | +++ |
| 60V | 67 | .0065 I | .0015 II | −48 | 10 | ++++ |
| 60V | 68 | .01 I | .01 II | −48 | 10 | ++++ |
| 60V | 69 | .003 I | .01 II | −48 | 0 | trace |
| 61V | 70 | .003 I | .02 II | −48 | 0 | |
| 61V | U.M.C. | 0 | 0 | | 80 | ++++ |
| 61V | M.C. | 0 | .05 II | | 0 | ++++ |
| 61V | 71 | .004 I | .0075 II | −48 | 0 | ++++ |
| 61V | 72 | .006 I | .0075 II | −48 | 20 | ++++ |
| 61V | 73 | .004 I | .01 II | −48 | 0 | ++++ |
| 61V | 74 | .006 I | .01 II | −48 | 0 | ++++ |
| 61V | 75 | .004 I | .015 II | −48 | 0 | ++++ |
| 61V | 76 | .006 I | .015 II | −48 | 0 | ++++ |
| 60V | U.M.C. | 0 | 0 | | 30 | +++ |
| 60V | 85 | .005 XVII | .01 II | −48 | 20 | +++ |
| 60V | 86 | .0075 XVII | .01 II | −48 | 0 | + |
| 61V | U.M.C. | 0 | 0 | | 80 | + |
| 61V | M.C. | 0 | .05 II | | 0 | + |
| 61V | 90 | .01 XVIII | .01 II | −48 | 0 | + |
| 67V | U.M.C. | 0 | 0 | | 50 | +++ |
| 67V | M.C. | 0 | .05 II | +24 | 0 | 0 |
| 67V | 92 | .0075 I | .02 XXIII | +24 | 0 | + |
| 67V | 93 | .0075 I | .02 XXIV | +24 | 0 | + |

In the tests tabulated above the drugs were administered by mixing them in the feed mash, that is, the birds were allowed to feed ad libitum on this ration. However, if desired, the drugs may be administered by medicating the drinking water, that is, by allowing the birds to partake ad libitum of this ration. The following Table III sets forth results of tests in which the drugs were administered by putting them in the drinking water which was set before the chicks. The 2,4-diamino-5-(p-chlorophenyl)-6-ethyl pyrimidine was solubilized by preparing a concentrate consisting of 1.14 grams of the compound, 235 ml. ethyl alcohol, 125 ml. "Tween 60" (a commercial wetting agent). The sulfaquinoxaline used was a commercial product "Quinatrol-25" which contains 25% sulfaquinoxaline.

TABLE III

| Group | Percent DAP [1] | Percent Sulfa [2] | Mortality, percent | Lesions |
|---|---|---|---|---|
| U.M.C. | | | 14 | ++++ |
| M.C. | | .025 II | 0 | +++ |
| A | .0025 I | .005 II | 0 | + |
| B | .005 I | .01 II | 0 | 0 |

[1] 2,4-diamino-5-(p-chlorophenyl)-6-ethyl-pyrimidine.
[2] Sulfaquinoxaline.

The following Table IV sets forth tabulative comparative results of another illustrative test showing the nature of the synergistic combination of a diamino-pyrimidine and a sulfa drug.

TABLE IV

| Test No. | Ref. No. | Drug, percent | Conditions | Ingestive Vehicle | Mortality, percent | Cecal Lesions |
|---|---|---|---|---|---|---|
| 58V | U.M.C. | 0 | +24 | mash | 40 | +++ |
| 58V | M.C. | .05 II | +24 | do | 0 | + |
| 58V | 32 | .02 XVII | +24 | do | 50 | +++ |
| 58V | 33 | .05 XVIII | +24 | do | 40 | + |
| 61V | U.M.C. | 0 | −48 | do | 80 | ++++ |
| 61V | M.C. | .05 II | −48 | do | 0 | ++ |
| 61V | 90 | .01 II and .01 XVIII | | do | 0 | |
| 59V | 84 | .015 II and .0075 XVII | +24 | do | 0 | 0 |

In the above Table IV the Roman numerals represent the drugs as indexed in Table II and otherwise the data is recorded in the same way as in Table II. It will be seen that the use of a combination of .01% sulfaquinoxaline and .01% of 2,4-diamino-6-methyl-5-(p-nitrophenyl)-pyrimidine produced a better result than .05% of 2,4-diamino-6-methyl-5-(p-nitrophenyl)-pyrimidine alone and as good a result as .05% sulfaquinoxaline alone, this showing the synergistic action of the combination. Also, a combination of .015% of sulfaquinoxaline and .0075% of 2,4-diamino-5-(p-chlorophenyl)-6-propyl pyrimidine produced as good results as .05% sulfaquinoxaline alone and better results than .02% of 2,4-diamino-5-(p-chlorophenyl)-6-propyl pyrimidine alone.

It will be understood by those skilled in the art that it is the base that is the physiologically active part of the compounds mentioned herein. Consequently, the salts, such as the acid addition salts, and other similar modifications of the diamino-pyrimidine compounds referred to herein are to be regarded as equivalents of the corresponding diamino-pyrimidines. It will also be understood by those skilled in the art that the use levels of therapeutic agents of the nature herein disclosed will vary under different circumstances. It is common practice in many quarters to use low levels (low concentration) of an active drug for feeding during the growing period (the first 8 to 12 weeks for chickens) to control the amount of infection which may develop in a flock during the growing period. Consequently, chicks which are exposed to a small amount of infection become immune to cecal coccidiosis and sudden attacks and losses are avoided or minimized. Drugs used in this manner are spoken of as prophylactic. They are prophylactic to the degree that they limit the development of the infection. On the other hand, in those cases where the flock has become badly infected higher use levels may be necessary to combat and suppress the infection. The therapeutic agents provided by the invention lend themselves for use in either situation and are effective both as prophylactic at low use levels and at higher use levels without undue toxic effect for combatting and suppressing an established case of the disease. Those skilled in the art will also understand that "use level" means the concentration of the therapeutic compound in the ingestive carrier vehicle fed to the poultry in order to administer the active compound and the use level must be such that it does not exceed a concentration which is unduly toxic.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. A ration for ad libitum feeding to a flock of poultry to combat the disease of coccidiosis in the poultry flock without intolerable toxic effect upon the poultry which comprises a poultry feeding mash in which is incorporated not less than .002 percent and not more than .05 percent by weight of a diamino-pyrimidine having the formula:

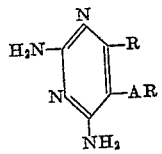

where R is selected from the class consisting of H and an alkyl group containing one to five carbons inclusive and Ar is selected from the class consisting of p-chlorophenyl and 3,4-dichlorophenyl.

2. A composition which may be fed to the poultry as a normal feeding ration and consumed ad libitum for the control of coccidiosis in poultry which comprises a mixture of a poultry feeding mash and a coccidiostat ingredient comprising a diamino-pyrimidine compound selected from the class consisting of 2,4-diamino-5-(p-chlorophenyl)-6-methyl pyrimidine; 2,4-diamino-5-(p-chlorophenyl)-6-ethyl pyrimidine; 2,4-diamino-6-n-amyl-5-(p-chlorophenyl)-6-ethyl-pyrimidine, 2,4-diamino-6-n-amyl-5-(p-chlorophenyl)-pyrimidine, and 2,4-diamino-5-(3'4'-dichlorophenyl)-6-methyl pyrimidine, said mixture containing not less than .002 percent and not more than .05 percent by weight of said coccidiostat ingredient whereby the diamino-pyrimidine may be administered in effective dosage and at a use level which allows the poultry to feed ad libitum on the mixture without intolerable toxic effect.

3. A chemotherapeutic composition for the control of coccidiosis in poultry which comprises a mixture of a diamino-pyrimidine selected from the class consisting of 2,4-diamino-5-(p-chlorophenyl)-6-methyl pyrimidine; 2,4-diamino-5-(p-chlorophenyl)-6-ethyl pyrimidine; 2,4-diamino-5-(p-chlorophenyl)-6-n-propyl pyrimidine; 2,4-diamino-6-n-amyl-5-(p-chlorophenyl)-pyrimidine; 2,4-diamino-5-(3',4'-dichlorophenyl)-6-methyl-pyrimidine, and 2,4-diamino-6-methyl-5-(p-nitro-phenyl)-pyrimidine; and sulfonamide selected from the class consisting of sulfaquinoxaline; sulfamerazine; sulfamethazine, sulfathiazole; sulfanilamide; sulfadiazine, and sulfaguanidine; said mixture being so proportioned with respect to its content of diamino-pyrimidine and to its content of sulfonamide that a predetermined quantity of said mixture may be intimately intermixed with a predetermined quantity of mash to form a poultry ration on which poultry may feed ad libitum without intolerable toxic effect and which will contain the diamino-pyrimidine and sulfonamide in effective dosage amounts but not exceeding .02 percent by weight of diamino-pyrimidine and not exceeding 0.4 percent by weight of sulfonamide.

4. A chemotherapeutic composition for the control of coccidiosis in poultry which comprises a mixture of a diamino-pyrimidine selected from the class consisting of 2,4-diamino-5-(p-chlorophenyl)-6-methyl pyrimidine; 2,4-diamino-5-(p-chlorophenyl)-6-ethyl pyrimidine; 2,4-diamino-5-(p-chlorophenyl)-6-n-propyl pyrimidine; 2,4-diamino-6-n-amyl-5-(p-chlorophenyl)-pyrimidine; 2,4-diamino-5-(3',4'-dichlorophenyl)-6-methyl-pyrimidine, and 2,4-diamino-6-methyl-5-(p-nitrophenyl)-pyrimidine; and sulfonamide selected from the class consisting of sulfaquinoxaline; sulfamerazine; sulfamethazine, sulfathiazole; sulfanilamide; sulfadiazine, and sulfaguanidine, said diamino-pyrimidine and sulfonamide being present in the composition in a ratio between 1 part diamino-pyrimidine to 20 parts sulfonamide and 1 part diamino-pyrimidine to 0.5 part sulfonamide.

5. A chemotherapeutic compositon for the control of coccidiosis in poultry which comprises a mixture of a diamino-pyrimidine selected from the class consisting of 2,4-diamino-5-(p-chlorophenyl)-6-methyl pyrimidine; 2,4-diamino-5-(p-chlorophenyl)-6-ethyl pyrimidine; 2,4-diamino-5-(p-chlorophenyl)-6-n-propyl pyrimidine; 2,4-diamino-6-n-amyl-5-(p-chlorophenyl)-pyrimidine; 2,4-diamino-5-(3',4'-dichlorophenyl)-6-methyl-pyrimidine, and 2,4-diamino-6-methyl-5-(p-nitrophenyl)-pyrimidine; and sulfonamide selected from the class consisting of sulfaquinoxaline; sulfamerazine; sulfamethazine, sulfathiazole; sulfanilamide; sulfadiazine, and sulfaguanidine, said diamino-pyrimidine and sulfonamide being present in said mixture in amounts and in a ratio of from .5 to 20 parts sulfonamide to 1 part diamino-pyrimidine and effective to control coccidiosis in poultry when said mixture is orally administered by ad libitum feeding to the poultry in an ingestive carrier vehicle in which said mixture is present in a concentration between .0005% and 0.5%.

6. A chemotherapeutic composition effective to control coccidiosis in poultry when orally administered at non-toxic use levels which comprises a combination of 2,4-diamino-5-(p-chlorophenyl)-6-ethyl pyrimidine and sulfaquinoxaline; there being present in the composition 0.1 to 3 parts by weight of said diamino-pyrimidine to 1 part by weight of said sulfaquinoxaline.

7. A composition effective to control coccidiosis in poultry which composition when diluted with a non-toxic ingestive comestible carrier will provide an effective dosage when orally administered by feeding it ad libitum to the poultry in the comestible at non-toxic use levels, said composition comprising a mixture of a sulfonamide selected from the class consisting of sulfaquinoxaline; sulfamerazine; sulfamethazine; sulfathiazole; sulfanilamide; sulfadiazine, and sulfaguanidine, and a 2,4-diamino-5-(p-chlorophenyl)-6-(alkyl)-pyrimidine having 1 to 3 carbon atoms in the alkyl group which is active synergistically with the sulfonamide in said mixture.

8. A composition effective to control coccidiosis in poultry which composition when diluted with a non-toxic ingestive comestible carrier will provide an effective dosage when orally administered by feeding it to the poultry in the comestible in a concentration of less than 0.5%, said composition comprising a mixture of one or more sulfonamides selected from the class consisting of sulfaquinoxaline; sulfamerazine; sulfamethazine; sulfathiazole; sulfanilamide; sulfadiazine, and sulfaguanidine, and a 2,4-diamino-5-(p-chlorophenyl)-6-(alkyl)-pyrimidine which is active synergistically with the sulfonamide in said mixture.

9. A chemotherapeutic feed ration for combatting the disease of coccidiosis in poultry on which the poultry may feed ad libitum comprising a poultry feed mash, sulfaquinoxaline and 2,4-diamino-5-(p-chlorophenyl)-6-ethyl pyrimidine, the sulfquinoxaline being present in the mixture in the ratio of .5 to 20 parts to 1 part of diamino-pyrimidine and the combined amounts of said sulfaquinoxaline and diamino-pyrimidine not exceeding .06% by weight of said mash.

10. A chemotherapeutic composition for combatting the disease of coccidiosis in poultry which comprises a mixture of 2,4-diamino-5-(p-chlorophenyl)-6-alkyl pyrimidine and sulfonamide of the class consisting of sulfanilamide, sulfathiazole, sulfamerazine, sulfamethazine, and sulfaquinoxaline, said mixture being so proportioned with respect to its content of diamino-pyrimidine and to its content of sulfonamide that a predetermined quantity of said composition may be intermixed with a predetermined quantity of an ingestive vehicle to form a poultry ration on which poultry may feed ad libitum without intolerable toxic effect and which will contain the diamino-pyrimidine and sulfonamide in effective dosage amount but not exceeding .02 percent by weight of diamino-pyrimidine and not exceeding .4 percent by weight of sulfonamide.

11. A chemotherapeutic composition for combatting coccidiosis in poultry which may be diluted with a non-toxic ingestive carrier vehicle for oral administration to the poultry comprising a mixture containing sulfaquinoxaline and 2,4-diamino-5-(p-chlorophenyl)-6-ethyl pyrimidine in the ratio of two parts to ten parts by weight of sulfaquinoxaline to 1 part by weight of said diamino-pyrimidine.

12. A chemotherapeutic composition for combatting coccidiosis in poultry which may be diluted with a non-toxic ingestive carrier vehicle for oral administration to the poultry comprising a mixture containing sulfaquinoxaline and 2,4-diamino-5-(p-chlorophenyl)-6-ethyl-pyrimidine in the ratio of ten parts by weight of sulfaquinoxaline to one part by weight of said diamino-pyrimidine.

References Cited in the file of this patent

Seiden: Mfg. Chemist, vol. 21, No. 4, April 1950, pp. 155, 156.

Falco et al.: Br. J. of Pharmacol. and Chemother., vol. 6, 1951, pp. 185–200, part. pp. 185, 186.

Greenberg et al.: J. of Pharmacol. and Exprt. Ther., vol. 99, No. 4, August 1950, pp. 444–449.

Eyles et al.: Pub. Health Rpts. vol. 67, No. 3, March 1952, pp. 249–252, part. pp. 249, 251.

Chandler: Introd. to Parasitology, 8th ed., 1950, John Wiley, N.Y., pp. 181, 182, 219 and 220.